United States Patent [19]

Haustein

[11] Patent Number: 5,131,886

[45] Date of Patent: Jul. 21, 1992

[54] HEATED AIR DELIVERY SYSTEM FOR VEHICLES

[76] Inventor: Norman E. Haustein, 2329 Longboat Dr., Naples, Fla. 33942

[21] Appl. No.: 730,047

[22] Filed: Jul. 15, 1991

[51] Int. Cl.⁵ .............................................. B60S 1/54
[52] U.S. Cl. ...................................... 454/93; 454/124
[58] Field of Search ................. 454/85, 93, 121, 124, 454/126, 127

[56] References Cited

U.S. PATENT DOCUMENTS

| | | | |
|---|---|---|---|
| 2,242,337 | 5/1941 | Aufiero | 454/127 X |
| 2,963,954 | 12/1960 | Baker | 454/121 X |
| 3,693,532 | 9/1972 | Colinet et al. | 454/126 |
| 4,300,720 | 11/1981 | Baier et al. | 454/93 X |
| 4,693,416 | 9/1987 | Hayakawa . | |
| 4,864,919 | 9/1989 | Schulz | 454/127 |
| 4,976,309 | 12/1990 | Averin | 165/42 |

FOREIGN PATENT DOCUMENTS 2338328 2/1975 Fed. Rep. of Germany ...... 454/127

*Primary Examiner*—Harold Joyce
*Attorney, Agent, or Firm*—Merrill N. Johnson

[57] ABSTRACT

A heated air delivery system for vans, trucks and buses which has a single heated air distribution compartment located beneath the dashboard and designed to deliver heated air to defrost the entire windshield through a single elongated tapered defroster discharge nozzle located along the center of the dashboard. The heated air distribution compartment is also designed to deliver heated air to other areas within the vehicle's interior such as the driver's area, the stepwell entry area and teh driver's side mirror. The heated air is delivered into a plenum chamber within the air distribution compartment preferably from an opening in the bottom of the compartment. The compartment also includes a defroster pattern stabilizing baffle plate which forms within the compartment an elongated passageway for heated air flowing to tthe elongated tapered defroster discharge nozzle so as to provide a constant defroster air discharge pattern despite varying volumes of heated air being diverted from the plenum chamber to other aireas within the vehicle's interior.

5 Claims, 2 Drawing Sheets

HEATED AIR DELIVERY SYSTEM FOR VEHICLES

BACKGROUND AND SUMMARY OF THE INVENTION

The invention lies in the field of heated air delivery systems for vehicles and particularly heated air delivery systems for vans, trucks and buses requiring from 200 up to approximately 1,000 cubic feet per minute of heated air within the vehicle's driver and passenger area.

Present systems for delivering heated air to the interiors of vans and buses are complicated, expensive to build and to maintain, and add to the congestion existing under the dashboard of most vehicles. In addition, the heated air delivered to defrost the vehicle's windshield conventionally fails to clear the entire extent of the windshield, creating dangerous gaps in the driver's field of vision.

The failure of most conventional air delivery systems to defrost and keep clear the entire windshield results from two things, namely, an improperly designed nozzle or nozzles from which heated air is directed toward the inside windshield surface, and the requirements of other areas within the vehicle which disrupt the defroster air flow pattern and thus reduces the performance of the windshield defroster.

It is an object of my invention to simplify the supply of heated air to the interior of vehicles, especially large vans, trucks and buses.

Further objects of my invention are to provide a constant defroster air discharge pattern which will defrost the entire windshield, and to reduce the cost, weight and size of the vehicle's heated air delivery system.

Briefly put, my heated air delivery system uses a single heated air distribution compartment which is located beneath the vehicle's dashboard and is designed to deliver heated air to defrost the entire surface of the windshield and also to deliver heated air to other areas within the vehicle such as the driver's area, the driver's side mirror and the stepwell entry area.

A single elongated defroster discharge nozzle having a tapering width is located beneath the windshield at the center of the dashboard, which discharges heated air to defrost the entire surface of the windshield.

Heated air is supplied to the air distribution compartment through an opening in the bottom of the compartment. Air flowing from the opening in the bottom of the compartment circulates within a plenum chamber in the compartment where high volume air flow may be diverted to other areas within the vehicle. The primary air flow within the plenum chamber circulates past a pattern stabilizing baffle plate which forms within the compartment an elongated passageway for air flowing to the elongated tapered defroster discharge nozzle so as to provide a constant defroster air discharge pattern despite large volumes of heated air being diverted to other areas within the vehicle.

DETAILED DESCRIPTION OF THE PREFERRED EMBODIMENT

Figure 1:
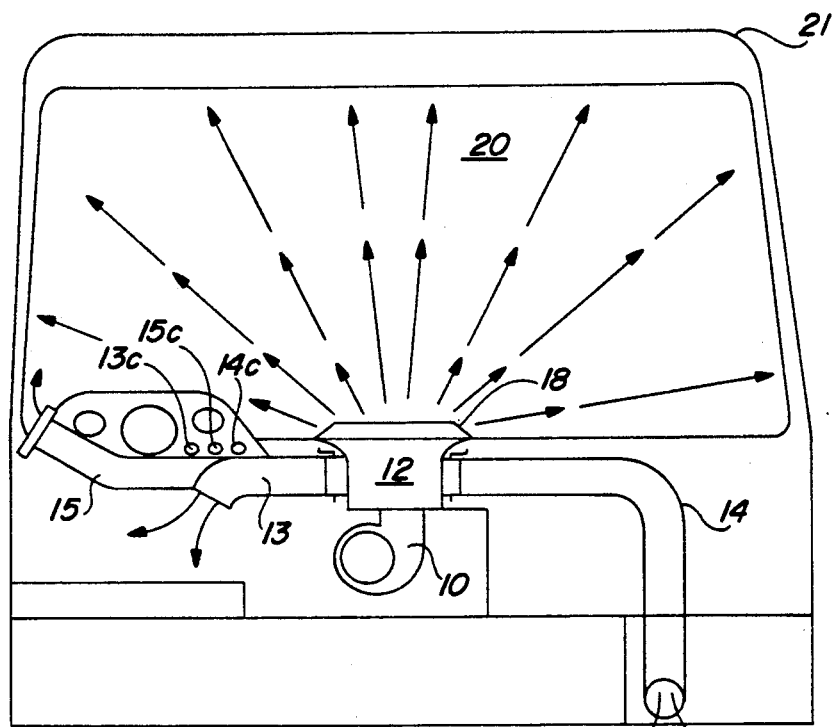
FIG. 1 is a diagramatic view taken from the rear showing the flow of heated air delivered by a preferred embodiment of my heated air delivery system installed beneath the dashboard of a bus.
Figure 2:
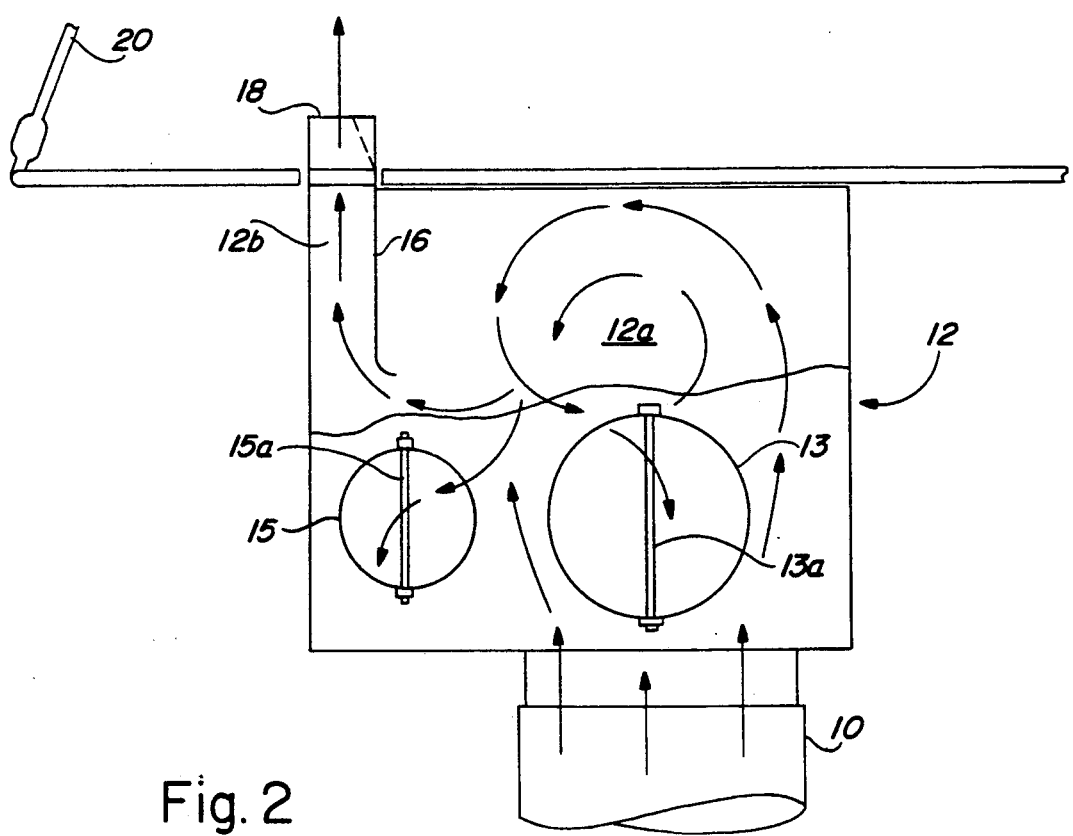
FIG. 2 is a left side diagramatic view partially broken away showing the flow of heated air in the air distribution compartment of the air delivery system shown in FIG. 1.
Figure 3:
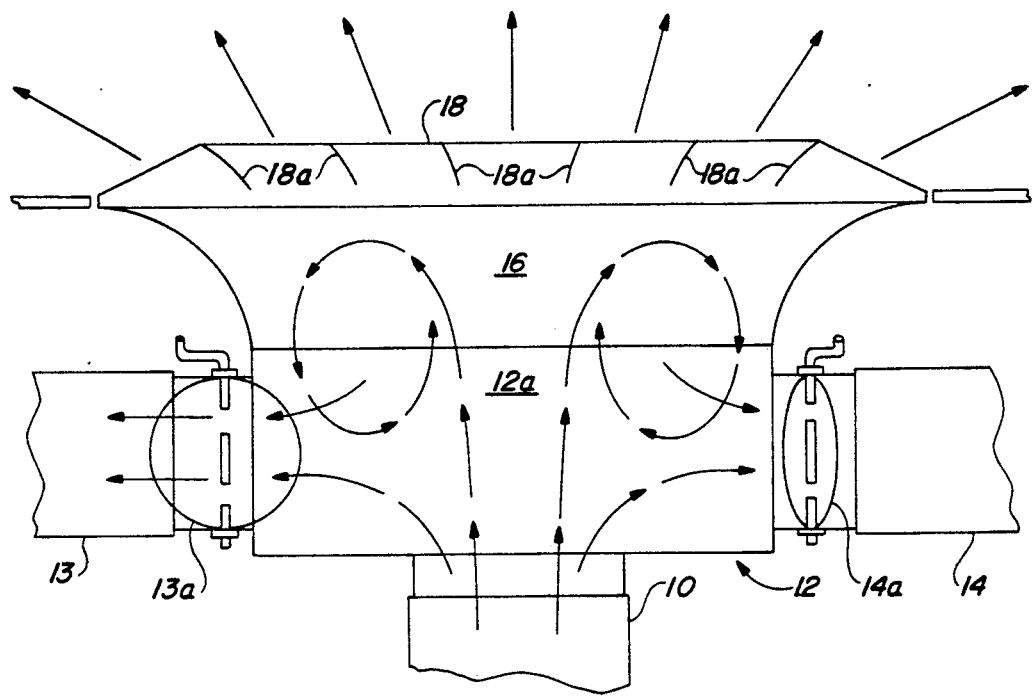
FIG. 3 is a diagramatic view taken from the rear showing the air flow within the air distribution compartment and the defroster discharge nozzle of the air delivery system shown in FIG. 1.

Referring to FIGS. 1, 2 and 3, heated air is delivered through a conduit 10 into a plenum chamber 12a within air distribution compartment 12, preferably through an opening in the center of the bottom of distribution compartment 12.

As shown in FIGS. 2 and 3, heated air delivered from conduit 10 into plenum chamber 12a will circulate within the plenum chamber, one side of which is a rigid stabilizing baffle plate 16 which also forms along with the adjacent inner wall of compartment 12 an elongated passageway 12b for heated air flowing from plenum chamber 12a into an elongated defroster discharge nozzle 18.

Figure 4:
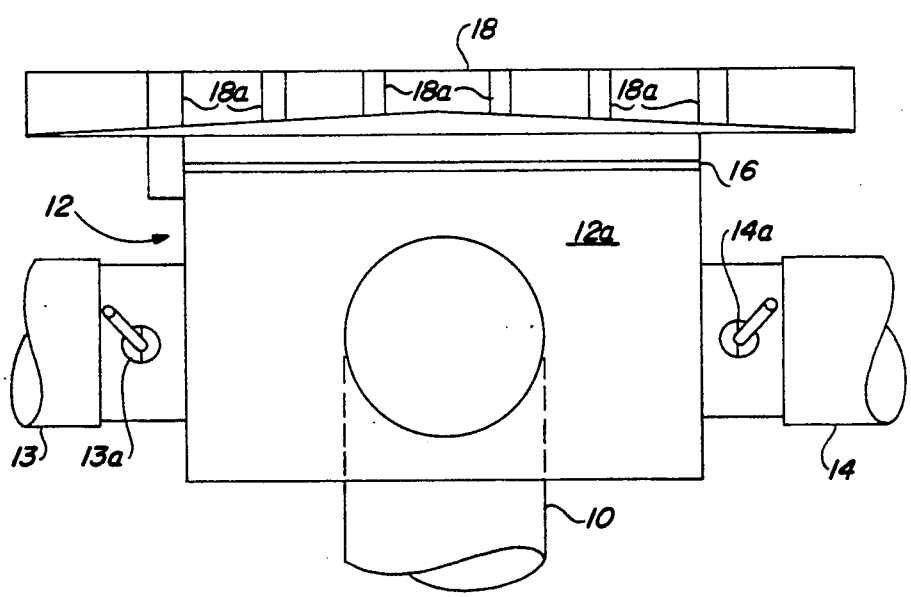
FIG. 4 is a top plan view showing the tapered defroster discharge nozzle and the heated air distribution compartment of the air delivery system shown in FIG. 1.

The exit opening in the top of nozzle 18 is uniquely tapered with its widest opening at each end and its narrowest opening at the center of nozzle as best shown in FIG. 4 so as to deliver more heated air towards the sides of windshield 20 than to its center. A plurality of spaced apart fins or air flow guide plates 18a within the upper end of nozzle 18 assist in distributing equal quantities of heated air to all sections of the large windshield 20 of vehicle 21.

The unique design of the passageway 12b, defroster discharge nozzle 18 and plenum chamber 12a all contribute to a constant defroster air discharge pattern delivered to the windshield despite varying volumes of heated air being diverted from the plenum chamber to other areas within the vehicle. Amongst those other areas are the driver's area, the stepwell entry area and the driver's side mirror shown in FIGS. 1, 2 and 3.

The driver's area receives heated air from conduit 13: the stepwell entry area, from conduit 14: and the driver's side mirror, from conduit 15. The volume of air entering conduit 13 is regulated by a valve 13a at the entrance to conduit 13 from plenum chamber 12a. Likewise, the volume of heated air entering conduits 14 and 15 is regulated by valves 14a and 15a respectively.

Valve 13a is shown in FIG. 3 in its fully open position while valve 14a is shown in a partially open position. Valves 13a, 14a and 15a are each individually moved from fully open to fully closed positions by controls 13c, 14c and 15c mounted on the dashboard of vehicle 21 as shown in FIG. 1. Thus the driver of vehicle 21 can vary the amount of heated air flowing to the driver's area, the stepwell entry area and the driver's side mirror by his adjustment from time to time of controls 13c, 14c and 15c.

However, due to the design of the plenum chamber 12a, and the baffle plate 16, elongated passageway 12b, and the uniquely tapered defroster discharge nozzle 18, the pattern of the heated air flowing to defrost the vehicle's windshield 20 remains constant despite varying amounts of heated air being diverted from plenum chamber 12a to heat the driver's area, the stepwell entry area and other portions of the vehicle's interior. Of course, if the volume of heated air diverted from the plenum chamber to these other areas is great enough to markedly reduce the volume of air flowing to the windshield defroster nozzle, it will require an increase in the volume of heated air delivered from conduit 10 into the plenum chamber to enable the heated air flowing from nozzle 18 to completely clear windshield 20.

While the exact size and shape of the air distribution compartment 12 and defroster nozzle 18 may vary, the bottom panel of the compartment shown in FIGS. 1 through 4 is 10 inches long and 8 inches wide and the compartment is 7 inches high measured from its bottom panel to the bottom of the defroster discharge nozzle. The elongated defroster discharge nozzle is 16 inches in length and measures 1½ inches wide at each end, tapering to a minimum width at its center of 1 inch. Preferably air distribution compartment 12 and defroster discharge nozzle 18 are molded of high impact resistant styrene or similar plastic material.

While I have shown and described a preferred embodiment of my unique heated air delivery system for a vehicle, modifications and changes will be apparent to those skilled in the art without departing from the spirit and scope of my invention. No limitations should be implied from the foregoing description and the scope of my invention is defined only in the following claims.

I claim:

1. A heated air delivery system for vehicles comprising
   a single heated air distribution compartment located beneath the vehicle's dashboard designed to deliver heated air to defrost the vehicle's entire windshield and also to deliver heated air to other areas within the vehicle's interior including the driver's area, the driver's side rear view mirror and the stepwell entry area,
   an elongated tapered defroster discharge nozzle in communication with the compartment, the discharge nozzle being located beneath the vehicle's windshield at the center of the dashboard,
   an opening in the air distribution compartment through which heated air is supplied to a plenum chamber within the air distribution compartment, and
   a defroster pattern stabilizing baffle plate within the compartment which forms adjacent the plenum chamber an elongated passageway for air flowing from the plenum chamber to the elongated tapered defroster discharge nozzle so as to provide a constant defroster air discharge pattern despite varying volumes of heated air being diverted to other areas within the vehicle.

2. A heated air delivery system as set forth in claim 1 in which the exit opening of the defroster discharge nozzle is widest at its opposite ends and tapers toward its center where the opening is the narrowest.

3. A heated air delivery system as set forth in claim 1 in which the defroster discharge nozzle contains a plurality of air flow guide plates mounted within the exit opening of the nozzle to direct the heated air across the entire windshield.

4. A heated air delivery system for vehicles comprising
   a single heated air distribution compartment located beneath the vehicle's dashboard designed to deliver heated air to defrost the vehicle's entire windshield and also to deliver heated air to other areas within the vehicle's interior including the driver's area,
   an elongated defroster discharge nozzle in communication with the compartment, the discharge nozzle being located beneath the vehicle's windshield at the center of the dashboard,
   said nozzle having an exit opening which is widest at its opposite ends and tapers toward its center where the opening is the narrowest,
   an opening in the bottom of the air distribution compartment through which heated air is supplied to a plenum chamber within the air distribution compartment, and
   a defroster pattern stabilizing baffle plate which forms within the compartment an elongated passageway for air flowing from the plenum chamber to the defroster discharge nozzle so as to provide a constant defroster air discharge pattern despite varying volumes of heated air being diverted to other areas within the vehicle.

5. A heated air delivery system as set forth in claim 4 in which the defroster nozzle contains a plurality of air flow guide plates mounted within the exit opening of the nozzle to direct the heated air across the entire windshield.

* * * * *